(No Model)

M. H. RUTHERFORD.
WEED OR BRIER PULLER.

No. 584,196. Patented June 8, 1897.

Witnesses:
J. S. Bowen
C. J. Belt

Inventor:
Melvin H. Rutherford,
By W. H. Wills,
Atty

UNITED STATES PATENT OFFICE.

MELVIN H. RUTHERFORD, OF CORRYTON, TENNESSEE.

WEED OR BRIER PULLER.

SPECIFICATION forming part of Letters Patent No. 584,196, dated June 8, 1897.

Application filed April 7, 1897. Serial No. 631,137. (No model.)

*To all whom it may concern:*

Be it known that I, MELVIN H. RUTHERFORD, a citizen of the United States, residing at Corryton, in the county of Knox and State of Tennessee, have invented certain new and useful Improvements in Brier or Weed Pullers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a brier and weed puller; and the object of the invention is to provide a device of improved construction and arrangement of parts for pulling briers, weeds, &c.

The invention consists in the novel construction, arrangement, and combination of parts, as will be hereinafter fully described, and set up in the specification and claims to follow.

Figure 1:
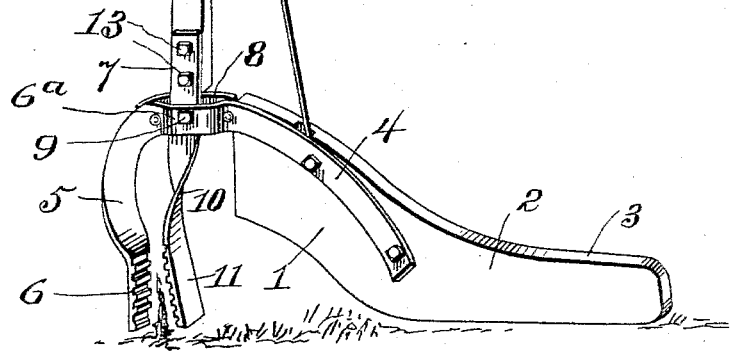
Figure 2:
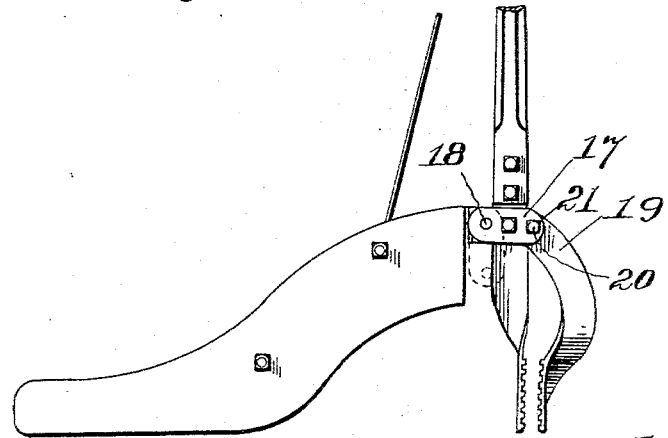

In the accompanying drawings, forming part of this application, Figure 1 is a perspective view of a weed and brier puller constructed in accordance with my invention. Fig. 2 is a rear side view of a modification.

The same numeral references denote the same parts throughout the figures of the drawings.

1 denotes the base, having an extension 2, the top of which forms a foothold 3 and the bottom of which forms a seat to rest upon the ground.

Secured to the base 1 is a fixed gripping-arm 4, which curves outwardly and downwardly from the base and has a half-twist 5, which terminates in a corrugated or toothed gripping-jaw 6. The arm 4 has an offset $6^a$, in which is pivoted the vertical gripping-arm 7 by means of a plate 8, riveted to the arm 4, and a pivot-bolt 9, passing through said offset, vertical arm, and said plate. This vertical arm 7 has a twist 10 and terminates in a corrugated or toothed clamping-jaw 11, the other end of said vertical arm being secured to a handle 12 by bolts 13.

Near the free end of the handle 12 are secured, by a nut $13^a$, lugs 14 by a screw-stem passing through the handle from the said lugs 14 and engaged by the nut $13^a$. Pivoted between the said lugs 14 is a hand-lever 15, which is connected to the base 1 by a pivoted lever 16, so that by pressing the hand-lever 15 and the handle 12 together the clamping-jaws are held in contact with each other, and by releasing the pressure on the hand-lever 15 the handle 12 is free to be moved back and forth.

Referring now to the modification shown in Fig. 2, the several parts of the device are of the same construction and arrangement as hereinbefore described, and shown in Fig. 1, except that in lieu of the riveted plate 8 the plate 17 is pivoted at 18 and its free end is secured to the arm 19 by a bolt and nut 20 and 21, so that by removing said bolt and nut and the pivot-bolt of the pivoted clamping-arm the latter may be removed without detaching it from its hand-lever.

I do not wish to be understood as limiting myself to any particular size or material in the manufacture of my device nor to its adaptability; but,

Having thus described my invention, what I claim as new, and desire to secure by Letters Patent, is—

1. In a weed and brier puller, the combination of the base having a foothold extension, and the curved twisted arm terminating in a toothed clamping-jaw, and having an offset, of the vertical arm pivoted in said offset, and having a twist terminating in a clamping-jaw, a handle secured to the vertical arm, a hand-lever pivoted to the free end of said handle, and the lever pivoted to the said hand-lever and to the said base, substantially as set forth.

2. In a weed and brier puller, the combination of the base and the arm fixed thereto, having a twist and terminating in a clamping-jaw, an offset in the said arm, of the vertical arm, the plate pivoted to the said fixed arm, and having a bolt extending therethrough and through the offset and vertical arm to pivot the latter to the fixed arm, said vertical arm terminating in a clamping-jaw, the hand-levers and the lever pivoted to the base, substantially as and for the purpose set forth.

In testimony whereof I affix my signature in presence of two witnesses.

MELVIN H. RUTHERFORD.

Witnesses:
J. E. WICKHAM,
TELIA TARVER.